(12) United States Patent
Hsueh et al.

(10) Patent No.: US 11,235,563 B2
(45) Date of Patent: Feb. 1, 2022

(54) RESIN COMPOSITION, MOLDED ARTICLE, FOOD CONTACT APPLIANCE AND FOOD CONTACT CONTAINER

(71) Applicant: CHIMEI CORPORATION, Tainan (TW)

(72) Inventors: Chan-Li Hsueh, Tainan (TW); Shih-Wei Huang, Tainan (TW); Wen-Yi Su, Tainan (TW)

(73) Assignee: CHIMEI CORPORATION, Tainan (TW)

( * ) Notice: Subject to any disclaimer, the term of this patent is extended or adjusted under 35 U.S.C. 154(b) by 396 days.

(21) Appl. No.: 16/235,806

(22) Filed: Dec. 28, 2018

(65) Prior Publication Data
US 2019/0202183 A1 Jul. 4, 2019

(30) Foreign Application Priority Data

Dec. 29, 2017 (TW) .................................. 106146449
Jan. 29, 2018 (TW) .................................. 107103103
Oct. 4, 2018 (TW) .................................. 107213477

(51) Int. Cl.
*B32B 27/30* (2006.01)
*C08L 33/20* (2006.01)
(Continued)

(52) U.S. Cl.
CPC .......... *B32B 27/308* (2013.01); *B32B 27/302* (2013.01); *C08J 3/005* (2013.01);
(Continued)

(58) Field of Classification Search
CPC . B32B 27/308; B32B 27/302; B32B 2439/70; C08L 25/12; C08L 33/20;
(Continued)

(56) References Cited

U.S. PATENT DOCUMENTS 9,701,834 B2 * 7/2017 Takahashi .................. C08L 9/00
2002/0077425 A1 * 6/2002 Kawano .............. C08L 2666/02
525/232
(Continued)

FOREIGN PATENT DOCUMENTS

CN 100335557 C 9/2007
CN 102977539 A 3/2013
(Continued)

OTHER PUBLICATIONS

CN104744845A-MT (machine translation of CN104744845A), Mei Chi-Lin, Jul. 2015, p. 1-28.*
(Continued)

*Primary Examiner* — James C Yager
(74) *Attorney, Agent, or Firm* — Muncy, Geissler, Olds & Lowe, P.C.

(57) ABSTRACT

A resin composition is provided. The resin composition includes a styrene-acrylonitrile based copolymer of 75 parts by weight to 90 parts by weight and rubber particles of 10 parts by weight to 25 parts by weight. The resin composition includes an oligomer trimer. The oligomer trimer includes at least one monomer unit selected from the group consisting of a styrene based monomer unit and an acrylonitrile based monomer unit. Wherein, a residual acrylonitrile based monomer is less than 5 ppm of the total weight of the resin composition. The ratio of the peak area of acetophenone to the peak area of air for the resin composition as analyzed by a thermal desorption gas chromatography mass spectrometer (TD-GC-MS) is 100 to 300.

18 Claims, 4 Drawing Sheets

(51) Int. Cl.
  *C08L 25/06* (2006.01)
  *C08L 25/12* (2006.01)
  *C08J 3/00* (2006.01)
  *B65D 81/34* (2006.01)

(52) U.S. Cl.
  CPC .............. *C08L 25/06* (2013.01); *C08L 25/12* (2013.01); *C08L 33/20* (2013.01); *B32B 2439/70* (2013.01); *B65D 81/3453* (2013.01); *C08J 2325/12* (2013.01); *C08J 2409/00* (2013.01)

(58) Field of Classification Search
  CPC ....... C08L 25/06; C08J 3/005; C08J 2409/00; C08J 2325/12; B65D 81/3453
  USPC ..... 428/327, 36.5, 36.8, 515, 212, 220, 339, 428/34.9, 35.7, 36.9, 402, 480, 483, 500, 428/517, 519, 520, 523
  See application file for complete search history.

(56) References Cited

U.S. PATENT DOCUMENTS

2003/0013815 A1* 1/2003 Wicher ................ C08F 279/02
                                                                525/263
2016/0326361 A1* 11/2016 Yamaguchi ............ C08L 51/04

FOREIGN PATENT DOCUMENTS

CN          104744845 A   *   7/2015   .............. C08L 25/12
TW          201525043 A       7/2015

OTHER PUBLICATIONS

First Office Action issued in corresponding CN application No. 201811374070.8 dated Mar. 1, 2021 (6 pages).

* cited by examiner

RESIN COMPOSITION, MOLDED ARTICLE, FOOD CONTACT APPLIANCE AND FOOD CONTACT CONTAINER

CROSS-REFERENCE TO RELATED APPLICATION

This application claims priority from Taiwan Patent Application No. 106146449, filed on Dec. 29, 2017, Taiwan Patent Application No. 107103103, filed on Jan. 29, 2018, and Taiwan Patent Application No. 107213477, filed on Oct. 4, 2018, Taiwan Intellectual Property Office, the contents of which are hereby incorporated by reference in their entirety for all purposes.

BACKGROUND

1. Technical Field

The present disclosure relates to a polymer, in particular to a resin composition, a molded article, a food contact appliance, and a food contact container suitable for a food contact container.

2. Description of the Related Art

Food health and safety have increased in public awareness in recent years, as the promotion of technology and medical knowledge has increased. On a related note, in addition to the regulations related to the food additives, safety regulations in regard to food packaging containers have also become an important issue. In particular, since Jul. 1, 2017, the Ministry of Health and Welfare in Taiwan has revised the provisions of the Food Safety Law. It is required that characteristics be clearly indicated on plastic materials which come into contact with food in order to facilitate wise purchases by consumers. Therefore, with the Food Safety Law being more and more rigorous, it is expected that plastic materials suitable for food contact containers can have enormous business opportunities.

Among various plastic materials, a styrene based resin is a common material used in the manufacturing of plastic containers since the composition of styrene based resin may be modified by a rubber modification to increase its processability which is useful to process into various molded articles.

However, in the manufacturing process of a styrene based resin, not only may there be the problem of excessive content of residual monomer, but the problem of undesirable odor caused by excessive addition of sulfur-containing antioxidants also exists. This undesirable odor is strong enough that the styrene based resin prepared by this process is not suitable for manufacture of food contact containers. Further, since a styrene based resin is usually processed by injection molding, another problem may be present in the manufacturing process, which is poor quality of the molded article caused by excessive mold oil stain. Therefore, it is necessary to develop a resin composition with a low content of residual monomer, a mild smell, and a low mold oil stain.

SUMMARY

In view of the above problems, the present disclosure aims to provide a resin composition, a molded article, a food contact appliance, and a food contact container to solve the above-mentioned problems in the prior art.

According to the purpose of the present disclosure, a resin composition is provided. The resin composition includes a styrene-acrylonitrile based copolymer of 75 parts by weight to 90 parts by weight and rubber particles of 10 parts by weight to 25 parts by weight. The resin composition includes an oligomer trimer. The oligomer trimer includes at least one monomer unit selected from the group consisting of a styrene based monomer unit and an acrylonitrile based monomer unit. Wherein, a residual acrylonitrile based monomer is less than 5 ppm of the total weight of the resin composition. A ratio of the peak area of acetophenone to the peak area of air for the resin composition as analyzed by a thermal desorption gas chromatography mass spectrometer (TD-GC-MS) is 100 to 300.

According to the purpose of the present disclosure, a molded article is also provided. The molded article is made of the resin composition as described above.

According to the purpose of the present disclosure, a food contact appliance is also provided. The food contact appliance includes a handheld portion and a food contact portion coupled to the handheld portion. The food contact portion includes the resin composition as described above. The food contact appliance may be teaware, a shovel, a scoop, a table knife, a fork, a spoon, sugar tongs, a serving spoon, or a mold.

According to the purpose of the present disclosure, a food contact container is also provided. The food contact container includes a bottom and an outer sidewall surrounding the bottom; wherein at least one of the bottom and the outer sidewall includes the resin composition as described above. The food contact container may be a cup, a teapot, a bottle, a bowl, a plate, a lunch box, or a food storage container.

The resin composition, the molded article, the food contact appliance, and the food contact container have one or more of the following advantages.

(1) The resin composition, the molded article, the food contact appliance, and the food contact container of the present disclosure have an advantage of the low content of the residual acrylonitrile based monomer. According to China's National Food Safety Standards, the residual acrylonitrile based monomer of the acrylonitrile-styrene resin (AS) molded article and the acrylonitrile-butadiene-styrene resin (ABS) molded article should be less than 50 mg/kg and 11 mg/kg, respectively. The residual acrylonitrile based monomer of the resin composition and the molded article thereof is less than 5 ppm of the total weight of the resin composition which is lower than the maximum described in the National Food Safety Standards. Therefore, the resin composition, the molded article, the food contact appliance, and the food contact container of the present disclosure comply with the regulations of food contact containers, which may be used as processing materials for food contact containers.

(2) The resin composition, the molded article, the food contact appliance, and the food contact container of the present disclosure have a mild smell. Since acetophenone is an aromatic component similar in scent to almond, cherry, honeysuckle, jasmine, and strawberry, the resin composition or the molded article containing acetophenone will have an odor. However, in the case that the content of acetophenone is too high, a strong repulsive smell will be produced. Therefore, the resin composition and the molded article of the present disclosure intentionally control the content of acetophenone such that a ratio of the peak area of acetophenone to the peak area of air analyzed by a thermal desorption gas chromatography mass spectrometry is 100 to 300. Thus, the resin composition and the molded article of the present disclosure have a mild smell in order to prevent consumers from being uncomfortable when the resin composition and the molded article are being used.

(3) The resin composition, the molded article, the food contact appliance, and the food contact container of the present disclosure also have an advantage of the low content of the mold oil stain left in the injection machine, even after multiple uses for molding. In the manufacturing process, the existence of a large amount of mold oil stain leads to poor quality of the molded article and low processing capacity. Therefore, the resin composition, the molded article, the food contact appliance, and the food contact container of the present disclosure may be continuously produced over a long period of time while maintaining fine quality, thereby reducing the manufacturing cost.

DESCRIPTION OF THE PREFERRED EMBODIMENTS

In order to make the above purposes, technical features, and actual implementation benefits more readily understood by those of ordinary skill in the art, the embodiments will be described in more detail below with reference to the drawings.

Figure 1:
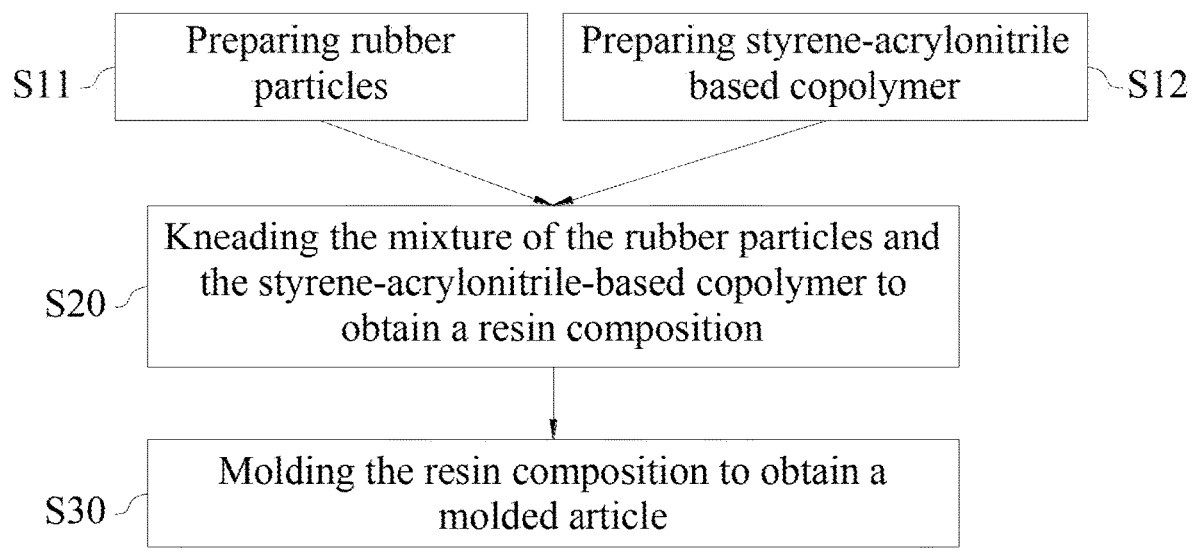
FIG. 1 is a preparation flow chart of an embodiment of a resin composition of the present disclosure.

Please refer to FIG. 1, illustrating a preparation flow chart of an embodiment of a resin composition of the present disclosure.

In step S11 and step S12, rubber particles and a styrene-acrylonitrile based copolymer are prepared, respectively.

Rubber Particles

The rubber particles of the present disclosure include a rubber polymer and a rubber graft copolymer obtained by grafting onto the rubber polymer. The rubber particles may be made by the rubber polymer (solid content), a copolymerizable vinyl based monomer component containing a styrene based monomer, an acrylonitrile based monomer, and an optionally added additive, such as an emulsifier, a polymerization initiator, an activator, or a chain transfer agent. The graft polymerization reaction may be a bulk polymerization, a solution polymerization, a suspension polymerization, or an emulsion polymerization. The preferred graft polymerization reaction is an emulsion polymerization.

The said rubber polymer may be used singly or in combination, for example, but is not limited to: a diene based rubber, a polyacrylate based rubber, or a polysiloxane based rubber. The preferred rubber polymer is a diene based rubber. The preferred rubber particles are diene based rubber particles.

By implementing a method for preparing rubber particles by the emulsion polymerization, 2 parts by weight to 90 parts by weight (dry weight) of the diene based rubber emulsion may be graft-polymerized with 10 parts by weight to 98 parts by weight of the copolymerizable vinyl based monomer component, with the steps such as coagulation (coagulant), dehydration, drying, and the like. Wherein, based on 100 parts by weight of the said copolymerizable vinyl based monomer component, the copolymerizable vinyl based monomer component may include 40 parts by weight to 90 parts by weight of the styrene based monomer, 10 parts by weight to 60 parts by weight of the acrylonitrile based monomer, and 0 parts by weight to 40 parts by weight of other copolymerizable vinyl monomer, for which the other copolymerizable vinyl monomer is optionally selected according to the requirements. The rubber content of the rubber particles obtained by the above emulsion polymerization method is, for example, 25% by weight to 90% by weight, preferably 45% by weight to 80% by weight.

The said diene based rubber may be used singly or in combination, for example, but not limited to: a butadiene rubber, a butadiene-styrene rubber, a butadiene-acrylonitrile rubber, or a butadiene-methacrylonitrile rubber. The preferred diene based rubber is a butadiene rubber. The diene based rubber may be directly polymerized into particles by monomers, wherein the weight-mean diameter thereof is 0.05 μm to 0.8 μm, or may be polymerized into small particles with diameter of 0.05 μm to 0.18 μm, and then the small particles is enlarged by a conventional rubber enlarging method into a rubber emulsion with diameter of 0.2 μm to 0.8 μm. The above-mentioned rubber enlarging method may be a chemical enlarging method which adds an organic acid, a metal salt, or a polymer aggregating agent with a carboxylic acid group, a mechanical enlarging method with a mechanical stirring, or a frozen enlarging method. Wherein the polymer aggregating agent used in the chemical enlarging method may be a butyl acrylate-methacrylic acid copolymer.

The said emulsifier may be used singly or in combination, for example, but not limited to: a carboxylate such as sodium succinate, potassium aliphatate, sodium aliphatate, dipotassium alkenyl succinate, rose acid soap; a sulfonate such as sodium dihexyl sulfosuccinate, alkyl sulfate, sodium alkylbenzenesulfonate; and anionic emulsifiers such as sodium nonylphenol polyoxyethylene ether sulfate; and the like.

The said polymerization initiator may be used singly or in combination, for example, but not limited to: organic hydrogen peroxide, such as: diisopropyl benzene hydroperoxide, cumene hydroperoxide; peroxide, such as: dibenzoyl peroxide, tert-butyl peroxide; persulfate, such as potassium persulfate; and the like.

The said activator may be used singly or in combination, for example, but not limited to, ferrous sulfate, sodium formaldehyde sulfoxylate, disodium edetate dihydrate, tetrasodium pyrophosphate, and the like.

The said chain transfer agent may be used singly or in combination, for example, but not limited to, n-dodecyl mercaptan, t-dodecyl mercaptan, n-butyl mercaptan, n-octyl mercaptan and the like.

The said coagulant may be used singly or in combination, for example, but not limited to, acid such as sulfuric acid, acetic acid; alkaline earth metal salts, such as: calcium salt such as calcium chloride; magnesium salt such as magnesium chloride, magnesium sulfate; aluminum salt such as aluminum sulfate; and the like.

The said styrene based monomer may be used singly or in combination, for example, but not limited to, styrene, α-methylstyrene, α-chlorostyrene, p-tert-butylstyrene, p-methylstyrene, o-chlorostyrene, p-chlorostyrene, 2,5-dichlorostyrene, 3,4-dichlorostyrene, 2,4,6-trichlorostyrene or 2,5-dibromostyrene and the like. The preferred styrene based monomer is styrene.

The said acrylonitrile based monomer may be used singly or in combination, for example, but not limited to, acrylonitrile, α-methacrylonitrile, and the like. The preferred acrylonitrile monomer is acrylonitrile.

The said other copolymerizable vinyl monomer may be used singly or in combination, for example, but not limited to, acrylate based monomer, methacrylate based monomer, and monofunctional maleimide based monomer.

The said acrylate based monomer is, for example, but not limited to, methyl acrylate, ethyl acrylate, isopropyl acrylate, butyl acrylate, polyethylene glycol diacrylate, and the like.

The said methacrylate based monomer is, for example, but not limited to: methyl methacrylate, ethyl methacrylate, propyl methacrylate, butyl methacrylate, benzyl methacrylate, hexyl acrylate, cyclohexyl methacrylate, dodecyl methacrylate, 2-hydroxyethyl methacrylate, glycidyl methacrylate, dimethylaminoethyl methacrylate, ethylene dimethacrylate, neopentyl dimethacrylate, and the like.

The said monofunctional maleimide based monomer is, for example, but not limited to: maleimide, N-methylmaleimide, N-isopropylmaleimide, N-butylmaleimide, N-hexylmaleimide, N-octylmaleimide, N-dodecylmaleimide, N-cyclohexylmaleimide, N-phenylmaleimide, N-2-methylphenylmaleimide, N-2,3-dimethylphenylmaleimide, N-2,4-dimethylphenylmaleimide, N-2,3-diethylphenylmaleimide, N-2,4-diethylphenylmaleimide, N-2,3-dibutylphenylmaleimide, N-2,4-dibutylphenylmaleimide, N-2,6-dimethylphenylmaleimide, N-2,3-dichlorophenylmaleimide, N-2,4-dichlorophenylmaleimide, N-2,3-dibromophenylmaleimide, N-2,4-dibromophenylmaleimide, and the like.

The said other copolymerizable vinyl monomer is, for example, but not limited to: unsaturated carboxylic acid compound, such as acrylic based monomer (e.g., acrylic acid, methacrylic acid), anhydrous maleic acid, anhydrous methyl butenedioic acid, anhydrous trans-methyl butenedioic acid, fumaric acid, itaconic acid and a esterification monomer thereof (for example, dimethyl fumarate or dibutyl itaconate); ethylene; propylene; 1-butene; 1-pentene; 4-methyl-1-pentene; ethylene chloride; vinylidene chloride; tetrafluoroethylene; ethylene trichlorotrifluoride; hexafluoropropylene; butadiene; propenylamine; isobutyleneamine; vinyl acetate; ethyl vinyl ether; methyl vinyl ketone; triallyl isocyanate; and the like.

In step S11, rubber particles are prepared by the emulsion polymerization method.

In an embodiment of the present disclosure, preparing process of the rubber particles is reacting butadiene, potassium persulfate solution, potassium oleate, ethylene glycol dimethacrylate with distilled water to obtain a diene based rubber emulsion. Further, n-butyl acrylate, methacrylic acid, potassium persulfate solution, sodium lauryl sulfate solution, n-dodecyl mercaptan and distilled water are reacted to obtain a polymer aggregating agent emulsion containing carboxylic acid group. The polymer aggregating agent emulsion is used to carry out the diene based rubber emulsion enlarging process, and the enlarged rubber emulsion is obtained. The enlarged rubber emulsion is mixed with a styrene, acrylonitrile, t-dodecyl mercaptan, cumene hydroperoxide, ferrous sulfate solution, sodium formaldehyde sulfoxylate solution and ethylenediamine tetraacetic acid solution. As a result, the enlarged rubber emulsion reacts with the styrene-acrylonitrile copolymer by graft polymerization. Then, treatments of calcium chloride coagulation and dehydration drying are processed to obtain the rubber particles of the present disclosure.

Styrene-Acrylonitrile Based Copolymer

The styrene-acrylonitrile based copolymer of the present disclosure may be obtained by polymerizing a styrene based monomer and an acrylonitrile based monomer, and optionally adding another copolymerizable vinyl monomer. Wherein, the styrene based monomer is preferably from 60 parts by weight to 75 parts by weight, more preferably from 65 parts by weight to 70 parts by weight; the acrylonitrile based monomer is preferably from 25 parts by weight to 40 parts by weight, more preferably from 30 parts by weight to 35 parts by weight; and the other copolymerizable vinyl monomer is preferably from 0 parts by weight to 13 parts by weight, more preferably from 0 parts by weight to 8 parts by weight.

The polymerization method of the styrene-acrylonitrile based copolymer is not particularly limited, and may be a common method such as a solution copolymerization method, a bulk copolymerization method, an emulsion copolymerization method, a suspension copolymerization method, and the like. A preferred polymerization method of the styrene-acrylonitrile based copolymer is the solution copolymerization method or the bulk copolymerization method. The reactor used in the polymerization method may be one or more of a fully continuous stirred tank reactor (CSTR), a plug flow reactor (PFR), or a static mixing reactor. After polymerization, the obtained copolymer solution may be heated by a preheater, and volatile substances such as unreacted monomers and solvents are removed in a reduced pressure degassing tank. Next, the styrene-acrylonitrile based copolymer of the present disclosure may be obtained by extrusion granulation with a biaxial extruder. The operating temperature of the biaxial extruder is preferably from 220° C. to 240° C., and the operating pressure is preferably from 20 torr to 30 torr.

The type of the styrene based monomer has been described above, and will not be described.

The type of the acrylonitrile based monomer has been described above, and will not be described.

The types of other copolymerizable vinyl monomer has been described above, and will not be described.

In the solution copolymerization, the used solvent is, for example, benzene, toluene, ethylbenzene, p-xylene, o-xylene, m-xylene, pentane, octane, cyclohexane, methyl ethyl ketone, acetone, or methyl butanone.

In the solution copolymerization, a polymerization initiator may be optionally added. The type of the polymerization initiator is as described above, and will not be described.

In the solution copolymerization, a chain transfer agent may be optionally added. The type of the chain transfer agent is as described above, and will not be described.

The said styrene-acrylonitrile based copolymer may include a styrene based monomer unit, an acrylonitrile based monomer unit, or other polymerizable vinyl monomer unit. Here, the monomer unit means a structural unit formed by copolymerization of a styrene based monomer, an acrylonitrile based monomer, or other copolymerizable vinyl monomer. A preferred styrene-acrylonitrile based copolymer is a styrene-acrylonitrile copolymer.

The said styrene-acrylonitrile based copolymer is analyzed by a Fourier transform infrared spectrometer (FT-IR, manufactured by Nicolet Co., type: Nexus 470). The styrene based monomer unit is 65% to 80% by weight based on the total weight of the styrene-acrylonitrile based copolymer, more preferably 70% to 75% by weight. The acrylonitrile based monomer unit is 20% to 35% by weight based on the total weight of the styrene-acrylonitrile based copolymer, more preferably 25% to 30% by weight. Based on the total weight of the styrene-acrylonitrile based copolymer, when the weight percentages of styrene based monomer unit and the acrylonitrile based monomer unit are in the above range, the obtained styrene-acrylonitrile based copolymer has a high stiffness, high hardness, and high chemical resistance. The styrene-acrylonitrile based copolymer preferably has a weight average molecular weight of 100,000 to 150,000, more preferably from 120,000 to 130,000. When the weight average molecular weight of the styrene-acrylonitrile based copolymer is in the above range, the obtained styrene-acrylonitrile based copolymer applied to the resin composition of the present disclosure has a good fluidity and impact resistance.

In step S12, the styrene-acrylonitrile based copolymer is prepared by the solution polymerization method.

In an embodiment of the present disclosure, the preparing process of the styrene-acrylonitrile based copolymer of the present disclosure is mixing a styrene monomer, an acrylonitrile monomer, and ethylbenzene, adding a t-dodecyl mercaptan, and mixing the above components together. The above mixture was supplied to a fully continuous stirred tank reactor to polymerize, and the unreacted materials are removed in a reduced pressure degassing tank to obtain a polymerized fusion product. The obtained polymerized fusion product may be plastic-granulated by the biaxial extruder to obtain the styrene-acrylonitrile based copolymer of the present disclosure.

In step S20, a mixture of the rubber particles obtained in step S11, the styrene-acrylonitrile based copolymer obtained in step S12, and a lubricant is kneaded to obtain the resin composition of the present disclosure. The rubber particles are used as a dispersed phase, and the styrene-acrylonitrile based copolymer is used as a continuous phase. The auxiliaries may be any auxiliaries which are commonly used by those of ordinary skill in the art. The kneading method may be any kneading method which is commonly used by those of ordinary skill in the art.

The total weight of the resin composition of the present disclosure has 100 parts by weight, which includes 75 parts by weight to 90 parts by weight of the styrene-acrylonitrile based copolymer and 10 parts by weight to 25 parts by weight of the rubber particles, preferably including 80 parts by weight to 85 parts by weight of the styrene-acrylonitrile based copolymer and 15 parts by weight to 20 parts by weight of the rubber particles. When the content of the styrene-acrylonitrile based copolymer is too high or the content of the rubber particles is too low, the impact resistance of the resin composition decreases; and when the content of the styrene-acrylonitrile-based copolymer is too low or the rubber particle content is too high, the resin composition has a low stiffness.

In the resin composition of the present disclosure, the residual acrylonitrile based monomer is less than 5 ppm of the total weight of the resin composition. Thus the resin composition complies with the National Food Safety Standards for food packaging containers so as to be used as a material for a food contact container. Further, the resin composition of the present disclosure includes an oligomer trimer including at least one monomer unit selected from the group consisting of a styrene based monomer unit and an acrylonitrile based monomer unit. Based on the total weight of the resin composition, the content of the oligomer trimer is preferably from 4,000 ppm to 7,000 ppm, more preferably from 4,000 ppm to 6,800 ppm, still more preferably from 4,000 ppm to 6,500 ppm. When the content of the oligomer trimer is in the above range, the resin composition has a low mold oil stain in order to be continuously produced for a long period of time, thereby reducing the manufacturing cost. The said oligomer trimer includes, for example, S3, S2A1, S1A2, A3, or a combination thereof, wherein S represents a styrene based monomer unit and A represents an acrylonitrile based monomer unit. That is, the oligomer trimer may include a homo-oligomer trimer, a hetero-oligomer trimer, or a combination thereof. Further, a ratio of the peak area of acetophenone to the peak area of air for the resin composition as analyzed by a thermal desorption gas chromatography mass spectrometer (TD-GC-MS) is 100 to 300. When the ratio of the peak area of acetophenone to the peak area of air is in the above range, the resin composition has a mild smell which prevents consumers from being uncomfortable when using the resin composition. When the ratio of the peak area of acetophenone to the peak area of air is less than 100, the resin composition does not have a mild smell, and the consumer may not a pleasant using experience. When the ratio of the peak area of acetophenone to the peak area of air is larger than 300, the resin composition has a strong repulsive smell which may cause discomfort to the consumer. The ratio of the peak area of acetophenone to the peak area of air may be controlled by an additional method or process, for example, by cleavage of a polymerization initiator used in the rubber particle synthesis reaction.

In step S30, the above resin composition is plastically molded to obtain a molded article. Wherein, the plastic molding method may be any plastic molding method which is commonly used by those of ordinary skill in the art.

The resin composition of the present disclosure will be more specifically described below with reference to several experiments. Although the following experiments are described, the used materials, the amounts and ratios thereof, the processing details, the processing step, and the like may be appropriately adjusted without departing from the scope of the disclosure. Thus, the present disclosure should not be construed restrictively based on the experiments described below.

In one embodiment, the rubber particles of the present disclosure are prepared with the following ratios. 150 parts by weight of 1,3-butadiene, 15 parts by weight of 1 wt % potassium persulfate solution, 2 parts by weight of potassium oleate, 0.13 parts by weight of ethylene glycol dimethacrylate, and 190 parts by weight of the distilled water are reacted at a reaction temperature of 65° C. for 14 hours to obtain a diene based rubber emulsion having a weight-mean diameter of 0.1 μm, a conversion rate of about 94%, and a solid content of about 36%. Further, 90 parts by weight of n-butyl acrylate, 10 parts by weight of methacrylic acid, 0.5 part by weight of 1 wt % potassium persulfate solution, 0.5 part by weight of 10 wt % sodium lauryl sulfate solution, 1 part by weight of n-dodecyl mercaptan, and 200 parts by weight of distilled water are reacted at a reaction temperature of 75° C. for 5 hours to obtain a polymer aggregating agent emulsion containing carboxylic acid group with a conversion rate of about 95% and a pH value of about 6. Based on the dry weight, 3 parts by weight of the polymer aggregating agent emulsion and 100 parts by weight of the diene based rubber emulsion are reacted to implement an enlarging process of the diene based rubber emulsion, in order to obtain an enlarged rubber emulsion with a weight-mean diameter of about 0.3 μm and a pH value of about 8.5. Then, based on the dry weight, 300 parts by weight of the enlarged rubber emulsion, 75 parts by weight of styrene, 25 parts by weight of acrylonitrile, 2 parts by weight of the t-dodecyl mercaptan, 3 parts by weight of cumene hydroperoxide, 3 parts by weight of 0.2 wt % ferrous sulfate solution, 0.9 part by weight of 10 wt % sodium formaldehyde sulfoxylate solution, and 3 parts by weight of 0.25 wt % ethylenediamine tetraacetic acid are mixed to implement a graft polymerization of the enlarged rubber emulsion and the styrene-acrylonitrile based copolymer. Further, treatments of calcium chloride coagulation and dehydration drying are processed to make a drying ratio less than 2%, in order to obtain rubber particles with a weight-mean diameter of about 0.31 μm and a rubber content of 75 wt %. This resulting product is referred to as BP.

In one embodiment, the styrene-acrylonitrile based copolymer of the present disclosure is prepared with the following ratios. After mixing 68 parts by weight of styrene, 32 parts by weight of acrylonitrile, and 8 parts by weight of ethylbenzene, 0.01 parts by weight of a t-dodecyl mercaptan is further added and mixed. The above mixture is continuously supplied at a flow rate of 35 kg/hr to a fully continuous stirred tank reactor having a volume of 40 L, and reacts at an internal temperature of 140° C. and at a pressure of 4 kg/cm² to implement a polymerization. An overall conversion rate thereof is about 55%. The obtained copolymer solution is heated by a preheater, and volatile substances such as unreacted monomers and solvents are removed in a reduced pressure degassing tank to obtain a polymerized fusion product. The obtained polymerized fusion product may be plastic-granulated by a biaxial extruder at a temperature of 230° C. and a pressure of 30 torr, in order to obtain the styrene-acrylonitrile based copolymer with a weight average molecular weight of 125,000, a content of the styrene monomer unit of 72% by weight, and a content of the acrylonitrile monomer unit of 28% by weight. This resulting product is referred to as AS-1.

In another embodiment, the styrene-acrylonitrile based copolymer of the present disclosure is prepared under the same conditions, except changing the internal temperature of the continuous stirred tank reactor to 145° C., and changing the biaxial extruder to a temperature of 230° C. and a pressure of 20 torr, in order to obtain a styrene-acrylonitrile based copolymer with a weight average molecular weight of 125,000, a content of the styrene monomer unit of 72% by weight, and a content of the acrylonitrile monomer unit of 28% by weight. The resulting product is referred to as AS-2.

In a comparative embodiment, a styrene-acrylonitrile based copolymer is prepared under the same conditions, except changing the internal temperature of the continuous stirred tank reactor to 135° C., and directly extruding the polymerized fusion product, in order to obtain a styrene-acrylonitrile based copolymer with a weight average molecular weight of 125,000, a content of the styrene monomer unit of 72% by weight, and a content of the acrylonitrile monomer unit of 28% by weight. This product is referred to as AS-3.

Measurement of the content ratio of the monomer unit: After dissolving the styrene-acrylonitrile based copolymer resin in tetrahydrofuran (THF) and drawing the film for analysis, the film is analyzed by a Fourier transform infrared spectrometer (FT-IR, manufactured by Nicolet, type: Nexus 470).

Measurement of the weight average molecular weight: The product is then analyzed by a gel permeation chromatography instrument (GPC, manufactured by Waters Co., Ltd., with a refractive index detector (type: Waters RI-2414) and an ultraviolet visible light detection (type: Waters PDA-2996)) under the following conditions: column: MZ-Gel SDplus linear 5 μm, 300 mm×8.0 mm, and mobile phase: THF (flow rate: 0.5 mL/min).

Following the above, the ratio of the preferred examples 1 and 2, and the comparative example 1 are as shown in Table 1.

TABLE 1

|  | example 1 | example 2 | comparative example 1 |
|---|---|---|---|
| BP | 19 parts by weight | 19 parts by weight | 19 parts by weight |
| AS-1 | 81 parts by weight | — | — |
| AS-2 | — | 81 parts by weight | — |
| AS-3 | — | — | 81 parts by weight |
| lubricant | 2 parts by weight | 2 parts by weight | 2 parts by weight |

Here, the symbol "-" means "not added".

The parts by weight shown in Table 1 represent parts by weight under a dry condition. After preparing a mixture according to the content shown in Table 1, and kneading and extruding at a temperature of 220° C. with a biaxial extruder (type: ZPT-25, manufactured by Zeji Industry Co., Ltd.), the resin composition of the examples 1 and 2, and the comparative example 1 of the present disclosure can be obtained.

Next, the properties of examples 1 to 2 and comparative example 1 of the resin composition of the present disclosure are tested, and the results of the test are shown in Table 2.

TABLE 2

|  | example 1 | example 2 | comparative example 1 |
|---|---|---|---|
| oligomer trimer | 4084 ppm | 6093 ppm | 7888 ppm |
| residual acrylonitrile based monomer | 2.5 ppm | 2.4 ppm | 32 ppm |
| ratio of the peak area of acetophenone to the peak area of air | 178 | 225 | 398 |
| smell | ○ | ○ | X |
| mold oil stain | 0.0048 g | 0.0032 g | 0.0060 g |
| melt flow rate (MVR) | 18 mL/10 min | 18 mL/10 min | 18 mL/10 min |
| IZOD impact strength | 19 KJ/m² | 19 KJ/m² | 19 KJ/m² |

As shown in Table 2, the content of the oligomer trimer and the residual acrylonitrile based monomer are analyzed. The resin composition of the present disclosure is analyzed and quantified by a gas chromatography (manufactured by Agilent; type: 7890) with a flame ionization detector (FID). The content of the oligomer trimer and the residual acrylonitrile based monomer shown in Table 2 are calculated by weight based on the total weight of the resin composition. As shown in Table 2, the content of the oligomer trimer of examples 1 and 2 are both between 4,000 ppm to 7,000 ppm, and the content of the residual acrylonitrile monomer is less than 5 ppm, representing that the resin composition is suitable for manufacturing food contact container.

As shown in Table 2, the resin composition of the present disclosure is analyzed by a thermal desorption (TD) and a gas chromatography (manufactured by Agilent; type: 7890) with a mass selective detector (MSD). The resin composition is cryo-milled, and 5 mg of the resin composition is weighed and treated under a thermal desorption at 250° C. for 5 min, and then measured. The ratio is calculated by dividing the measured peak area of the acetophenone with the measured peak area of air. As shown in Table 2, the ratios of examples 1 and 2 are both between 100 and 300, representing that the resin compositions have mild smells.

In addition, smell measurements are also used to retest the smell of examples 1 and 2 and comparative example 1. Fifty grams of the resin composition are weighted and placed in a glass vial for one day, and the inspector smells it directly. The evaluation standards are as follows: without a repulsive smell and with a sweet-scented smell is marked ○, and with a strong repulsive smell is marked X. Therefore, as shown in Table 2, it can be verified again that the examples 1 and 2 have no repulsive smell and have a sweet-scented smell.

As shown in Table 2, the mold oil stain is analyzed. A test piece with size of 150×150×6 mm is injected by an injection molding machine using a test piece mold, wherein the injection condition is filling 80% of the mold and implementing continuous injection molding for 50 repetitions. The oil stain left on the mold is scraped off by a blade which has been weighed first, and blade with the oil stain is weighed again to obtain the weight of the mold oil stain. As shown in Table 2, the mold oil stains of the examples 1 and 2 are less than 0.0055 g, representing that the resin composition is a resin composition having low mold oil stains.

As shown in Table 2, the melt flow rate (MVR) and IZOD impact strength are analyzed. The melt flow rate (MVR) is analyzed according to ISO 1133. The analyzing conditions are: 220° C., the loading weight of 10 Kg, and units of mL/10 min. The IZOD impact strength is analyzed according to ISO 180/1A. The analysing conditions are: 23° C., the test piece with a notch, and units of $KJ/m^2$.

Another embodiment of the present disclosure provides resin particles. The resin particles include a continuous region and a plurality of dispersed regions disposed in the continuous region. The volume ratio of the continuous region to the dispersed region is 75:25 to 90:10. Wherein, the continuous region is formed of the styrene-acrylonitrile based copolymer. Each of the plurality of dispersed regions is formed of the rubber particles. The rubber particles are particulate particles having a weight-mean diameter of 0.05 μm to 0.8 μm, and the resin particles may be spheres, ellipsoids, elliptical cylinders, or irregularities. Wherein, the plurality of dispersed regions may be evenly or unevenly disposed in the continuous region.

Another embodiment of the present disclosure provides the food contact appliance and the food contact container.

Figure 2:
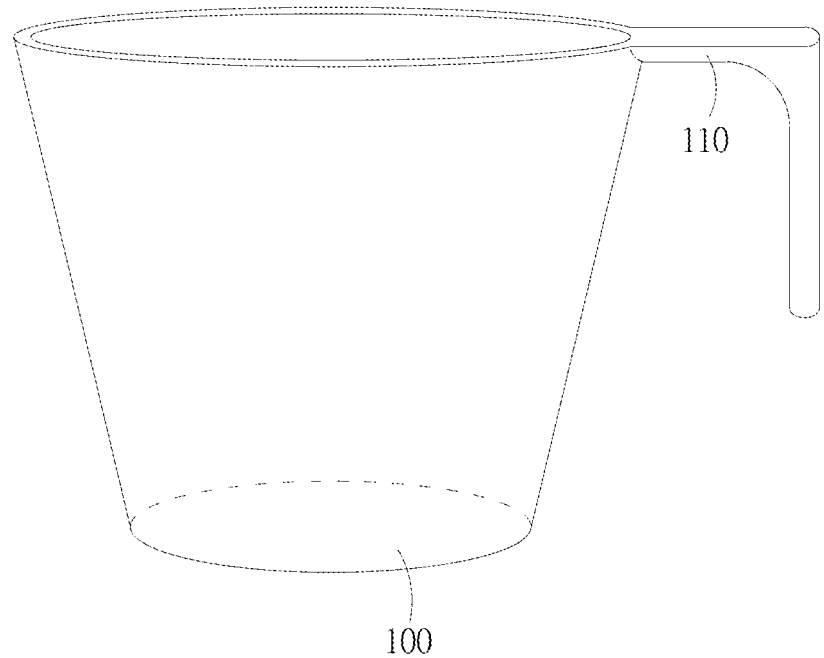
FIGS. 2-4 are schematic diagrams of an embodiment of a food contact appliance of the present disclosure, respectively.
Figure 3:
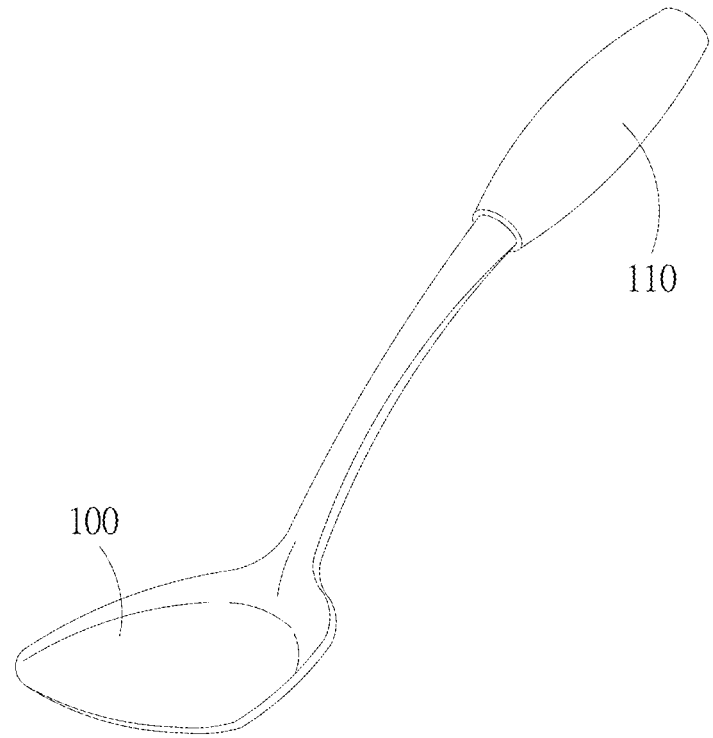
Figure 4:
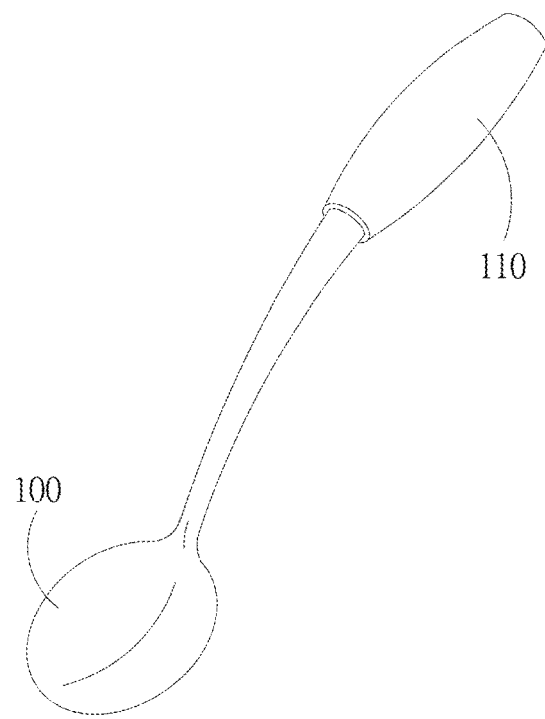

With reference to FIGS. 2-4, which are schematic diagrams of an embodiment of a food contact appliance of the present disclosure, respectively.

As shown in FIG. 2, the said food contact appliance may be a handheld measuring cup, wherein the said food contact portion 100 is a measuring cup for holding food, and the said handheld portion 110 is for the user to hold easily. As shown in FIG. 3, the said food contact appliance may be a spatula, wherein the said food contact portion 100 is a shovel for frying food, and the said handheld portion 110 is for the user to hold easily. As shown in FIG. 4, the said food contact appliance may be a spoon, wherein the said food contact portion 100 is a scoop for scooping food, and the said handheld portion 110 is for the user to hold easily.

In an embodiment, the food contact appliance may include the said handheld portion and the said food contact portion. The said food contact portion and the said handheld portion may be connected to each other. The said food contact portion and the said handheld portion may be individually molded and then connected. The said food contact portion and the said handheld portion may also be integrally molded.

The said food contact portion and the said handheld portion may be detachably connected. The said food contact portion includes the resin composition of the present disclosure, or the said food contact portion and the said handheld portion simultaneously include the resin composition of the present disclosure; for example, the said food contact portion and/or the said handheld portion may include metals, plastics, fibers, or a combination thereof, and the resin composition is coated on the surface thereof. In another embodiment, the said food contact portion may be made of the resin composition of the present disclosure. In another embodiment, the said food contact portion and the said handheld portion may be made of the resin composition of the present disclosure.

Wherein, the said handheld portion may be spherical, semi-spherical, cylindrical, semi-cylindrical, elliptical, regular polygonal columnar, irregular polygonal columnar, regular polygonal curved columnar, irregular polygonal curved columnar, or a combination thereof. The said regular polygonal columnar and the said irregular polygonal columnar may be a regular polygonal columnar shape and an irregular polygonal columnar shape with three sides, four sides or more. The said regular polygonal columnar shape is specifically, for example, a regular triangular columnar shape, a regular square columnar shape, or a regular pentagonal columnar shape. The said irregular polygonal columnar shape is specifically, for example, a rectangular columnar shape, a trapezoidal columnar shape, or a prismatic columnar shape. The said regular polygonal curved columnar and the said irregular polygonal curved columnar may a regular polygonal curved columnar shape and an irregular polygonal curved columnar shape with three sides, four sides or more. The shapes of the said cylindrical, the said semi-cylindrical, the said elliptical, the said regular polygonal columnar, the said irregular polygonal columnar, the said regular polygonal curved columnar and the said irregular polygonal curved columnar may be straight or curved.

The said food contact portion may be a circle, an ellipse, a regular polygon, an irregular polygon, a regular polygonal curve, an irregular polygonal curve, or a combination thereof. The said regular polygon and the said irregular polygon may be a regular polygon and an irregular polygon with three sides, four sides or more. The said regular polygon is specifically, for example, an equilateral triangle, a regular quadrangle, or a regular pentagon. The said irregular polygon is specifically, for example, a rectangle, a trapezoid, or a diamond. The said regular polygonal curve and the said irregular polygonal curve may be a regular polygonal curved shape and an irregular polygonal curved shape with three sides, four sides or more. The said food contact portion may be used to contact a food, for example, clipping, shoveling, cutting, sticking, or presenting the food. For example, the food contact portion may be teaware, a cake shovel, a scoop, a table knife, a fork, a spoon, a serving utensil such as sugar tongs, a serving spoon, or a mold for food forming That is, the food contact appliance may be teaware, a shovel, a scoop, a table knife, a fork, a spoon, sugar tongs, a serving spoon or a mold.

Figure 5:
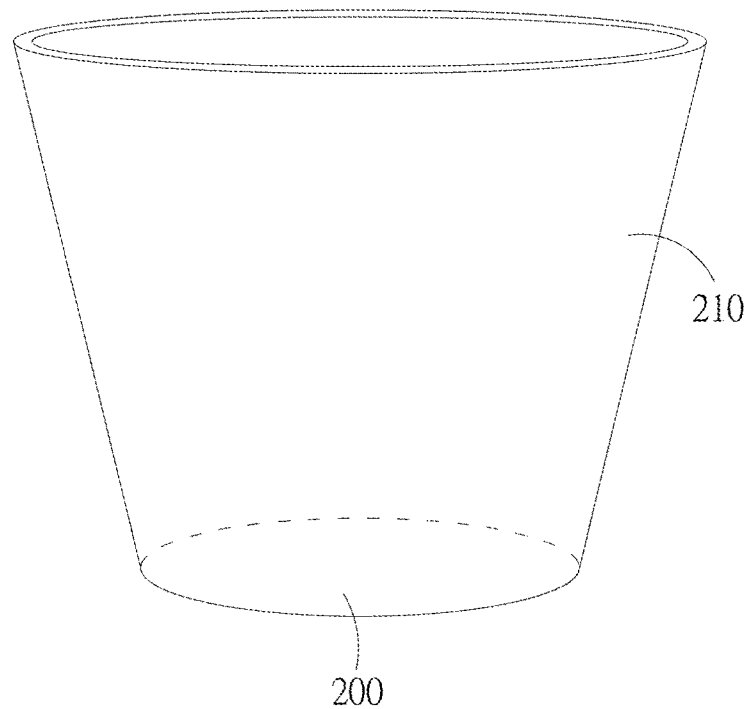
FIGS. 5-7 are schematic diagrams of an embodiment of a food contact container of the present disclosure, respectively.
Figure 6:
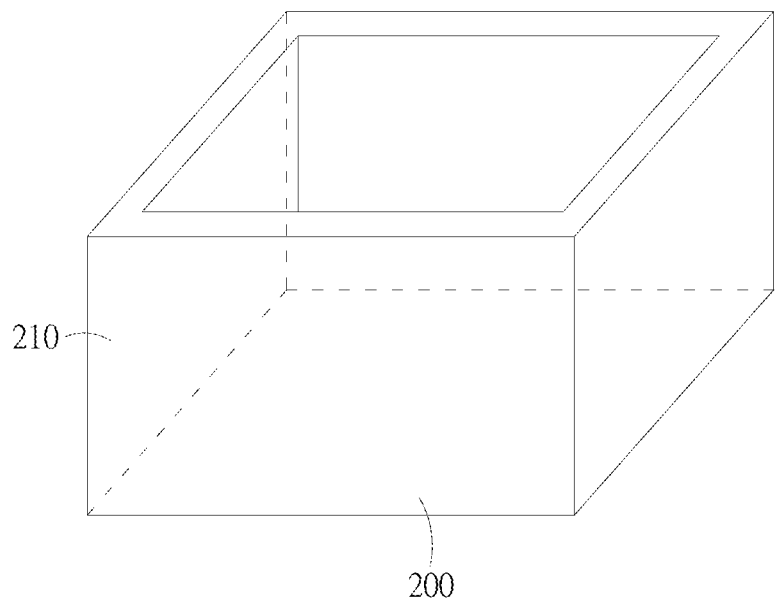
Figure 7:
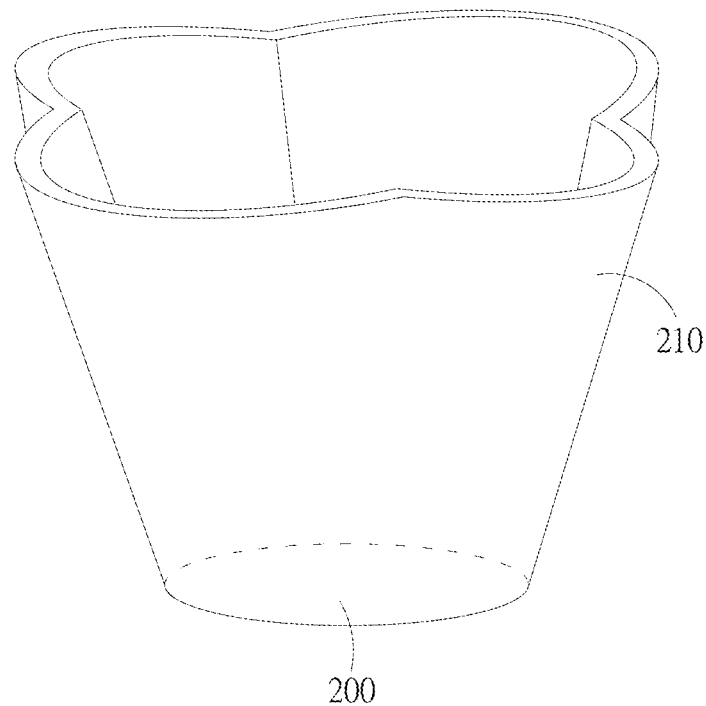

With reference to FIGS. 5-7, which are schematic diagrams of an embodiment of a food contact container of the present disclosure, respectively.

As shown in FIG. 5, the said food contact container may be a cup including the said bottom 200 and the said outer sidewall 210. As shown in FIG. 6, the said food contact container may be a food storage container including the said bottom 200 and the said outer sidewall 210. As shown in FIG. 7, the said food contact container may be a cake baking mold including the said bottom 200 and the said outer sidewall 210.

The said food contact container may include a bottom and an outer sidewall surrounding the bottom. The outer sidewall and the bottom portion can form an accommodating space. At least one of the said bottom and the said outer sidewall includes the resin composition of the present disclosure, that is, the said bottom and/or the said outer sidewall includes the resin composition. The said bottom and/or the said outer sidewall may also be made of the resin composition of the present disclosure. The said bottom and the said outer sidewall may be individually molded and then connected, or may be integrally molded.

Wherein, the said bottom may be the shape above mentioned shapes of the said food contact portion, and details are not described herein. The said food contact container may be used to hold a food, and the said bottom and the said outer sidewall may be used to contact a food product. For example, the said food contact container may be a cup, a teapot, a bottle, a bowl, a plate, a lunch box, or a food storage container.

In an embodiment, the said food contact container may further include a lid. The said lid may include metals, plastics, fibers, or a combination thereof. The said lid may be made of the resin composition of the present disclosure.

In summary, the resin composition of the present disclosure may be adjusted according to different requirements, and has the characteristics of being suitable for food contact containers and having mild smell and low mold oil stain.

The above mentioned is illustrative only and not restrictive. Any equivalent modifications or changes made to the spirit and scope of the present disclosure should be included in the extent of the patent application.

What is claimed is:

1. A resin composition, comprising:
  a styrene-acrylonitrile based copolymer, which is in an amount of 80 parts by weight to 85 parts by weight; and
  graft polymerized rubber particles, which are in an amount of 15 parts by weight to 20 parts by weight,
  wherein the resin composition comprises an oligomer trimer, and the oligomer trimer comprises at least one monomer unit selected from the group consisting of a styrene based monomer unit and an acrylonitrile based monomer unit,
  wherein a residual acrylonitrile based monomer is less than 5 ppm of a total weight of the resin composition,
  wherein a ratio of a peak area of acetophenone to a peak area of air for the resin composition as analyzed by a thermal desorption gas chromatography mass spectrometer (TD-GC-MS) is 100 to 300, and
  wherein a content of the oligomer trimer is a value between 4000 ppm to 7000 ppm of the total weight of the resin composition.

2. The resin composition according to claim 1, wherein the content of the oligomer trimer is a value between 4000 ppm to 6800 ppm of the total weight of the resin composition.

3. The resin composition according to claim 1, wherein the content of the oligomer trimer is a value between 4000 ppm to 6500 ppm of the total weight of the resin composition.

4. The resin composition according to claim 1, wherein a styrene based monomer unit of the styrene-acrylonitrile based copolymer is 65% to 80% by weight based on a total weight of the styrene-acrylonitrile based copolymer, and an acrylonitrile based monomer unit is 20% to 35% by weight based on a total weight of the styrene-acrylonitrile based copolymer.

5. The resin composition according to claim 1, wherein a styrene based monomer unit of the styrene-acrylonitrile based copolymer is 70% to 75% by weight based on a total weight of the styrene-acrylonitrile based copolymer, and an acrylonitrile based monomer unit is 25% to 30% by weight based on a total weight of the styrene-acrylonitrile based copolymer.

6. The resin composition according to claim 1, wherein the styrene-acrylonitrile based copolymer has a weight average molecular weight of 100,000 to 150,000.

7. The resin composition according to claim 1, wherein the styrene-acrylonitrile based copolymer has a weight average molecular weight of 120,000 to 130,000.

8. The resin composition according to claim 1, wherein the styrene-acrylonitrile based copolymer is a styrene-acrylonitrile copolymer.

9. The resin composition according to claim 1, wherein the styrene-acrylonitrile based copolymer is obtained by extrusion granulation with a biaxial extruder, and an operating temperature of the biaxial extruder is from 220° C. to 240° C., and an operating pressure is from 20 torr to 30 torr.

10. The resin composition according to claim 1, wherein the graft polymerized rubber particles are diene based rubber particles.

11. The resin composition according to claim 10, wherein the diene based rubber is a butadiene rubber.

12. The resin composition according to claim 1, wherein a weight-mean diameter of the graft polymerized rubber particles is 0.2 μm to 0.8 μm.

13. The resin composition according to claim 1, wherein a rubber content of the graft polymerized rubber particles is 25% by weight to 90% by weight.

14. The resin composition according to claim 1, wherein a rubber content of the graft polymerized rubber particles is 45% by weight to 80% by weight.

15. The resin composition according to claim 1, wherein the styrene-acrylonitrile based copolymer is prepared by a solution polymerization method, and the graft polymerized rubber particles are prepared by an emulsion polymerization method.

16. The resin composition according to claim 1, wherein the resin composition has a mold oil stain weight of less than 0.0055 g as measured by a mold oil stain test.

17. A molded article made of the resin composition according to claim 1.

18. A food contact container, comprising:
  a bottom; and
  an outer sidewall, surrounding the bottom;
  wherein at least one of the bottom and the outer sidewall comprises the resin composition according to claim 1.

* * * * *